United States Patent [19]

Laterra

[11] Patent Number: 5,114,596
[45] Date of Patent: May 19, 1992

[54] BACKWASH METHOD AND APPARATUS

[75] Inventor: Terrance Laterra, Old Bridge, N.J.

[73] Assignee: The Graver Company, Union, N.J.

[21] Appl. No.: 598,542

[22] Filed: Oct. 16, 1990

[51] Int. Cl.$^5$ .................................... B01D 25/32
[52] U.S. Cl. ................... 210/798; 210/333.01; 210/346; 134/22.12; 134/34
[58] Field of Search .................... 210/741, 798, 333.01, 210/346, 411, 486, 791, 797, 798; 134/22.12, 34

[56] References Cited

U.S. PATENT DOCUMENTS

| | | |
|---|---|---|
| 3,438,502 | 4/1969 | Schmidt, Jr. et al. ............... 210/798 |
| 3,637,079 | 1/1972 | Strub .............................. 210/333.01 |
| 3,744,633 | 7/1973 | Schmidt, Jr. et al. ......... 210/333.01 |
| 4,405,466 | 9/1983 | Giannelli et al. ................. 210/798 |
| 5,017,241 | 5/1991 | Ryan .............................. 210/333.01 |

Primary Examiner—Robert A. Dawson
Assistant Examiner—Wanda L. Millard
Attorney, Agent, or Firm—Dressler, Goldsmith, Shore, Sutker & Milnamow, Ltd.

[57] ABSTRACT

A method and apparatus for cleaning filter elements that are vertically positioned within a filter vessel that has a tube sheet dividing the filter vessel into a lower filter compartment and an upper plenum compartment. A fixed volume of backwash liquid is rapidly directed from the plenum compartment above the tube sheet through the filter elements into the filter compartment that has been drained of liquid. The rapid movement of the backwash liquid is a result of a pressure differential between the plenum compartment and the filter compartment. The volume of backwash liquid is maintained above the tube sheet by a pressurized condition in the filter compartment, which volume may be changed by adjusting the pressure in the filter compartment.

9 Claims, 2 Drawing Sheets 5,114,596

BACKWASH METHOD AND APPARATUS

FIELD OF THE INVENTION

This invention relates generally to a method and apparatus for cleaning a plurality of filter elements that are vertically positioned within a filter vessel. More specifically, the invention relates to a method and apparatus for cleaning such filter elements positioned within a filter vessel that has a tube sheet dividing the filter vessel into a lower filter compartment and an upper plenum compartment.

DESCRIPTION OF THE RELATED ART

The method and apparatus in accordance with the invention is disclosed in conjunction with a specific filter apparatus that utilizes precoats on filter elements. It is contemplated that the invention may be similarly utilized in conjunction with other types of filter apparatus that do not utilize precoats on filter elements.

It is known that liquids may be very effectively purified by passing them through a filter screen which has been precoated with a layer of particles, referred to herein as "precoat layer", such as ion exchange resin particles. Such precoat layer may remove dissolved solids and undissolved solids when the precoat layer contains active materials such as ion exchange particles. This method is disclosed in U.S. Pat. No. 3,250,703, issued May 10, 1966, and assigned to the same assignee of this application. Periodically, it becomes necessary to clean the filter because the precoat layer's adsorbent or absorbent capacity has been exhausted or the filter's resistance to flow has increased due to an accumulation of particles in or on the precoat layer, or within the filter elements, or both.

The filters normally employed are filter elements that have cylindrical cores with apertures to allow flow to pass through the walls of the cylinder. The core may be made of perforated metal, molded plastic, sintered powdered metal or plastic, laminated layers of woven wire metal or plastic, or other constructions providing adequate tensile and compressive strength and permeability. The filter elements are typically positioned within a filter vessel and are secured to a tube sheet that divides the filter vessel into a filter compartment and a plenum compartment. There are generally two types of such filter apparatus that employ vertically positioned elements; one has the plenum compartment above the filter compartment (top tube sheet filter), an example of such type is disclosed in U.S. Pat. No. 3,637,079. The other type has the plenum compartment below the filter compartment (bottom tube sheet filter), an example of such type is disclosed in U.S. Pat. No. 3,666,097. The present invention is particularly directed to cleaning the filter elements in the former type of filter apparatus.

It is the well known practice to clean the filter elements in a bottom tube sheet filter vessel by use of a series of steps that include a series of backwash cycles to force a high velocity flow of cleaning liquid through the filter elements in the reverse direction of the service flow at high velocities. The high velocity may be imparted to the cleaning liquid by use of gas from a pressurized source. Such a backwash cycle is commonly known as a gas or air surge backwash cycle. The volume of cleaning liquid that is forced through the filter elements during each backwash cycle is approximately equal to the volume of cleaning liquid that is in the plenum compartment above the lower ends of the tube sheet fittings associated with the filter elements. In existing filter apparatus where the volume of the plenum area is fixed, and in newly designed filter apparatus where limitations are placed on the vessel length or tube sheet fitting length, the volume of cleaning liquid flow during each cycle is accordingly limited.

In U.S. Pat. No. 4,405,466, assigned to the same assignee as the present application, a backwash method and apparatus is disclosed for a bottom tube sheet type of filter. The backwash system directs an external volume of backwash liquid into the plenum compartment and through the filter elements under gas. pressure. The volume of cleaning liquid directed through the filter elements during each backwash cycle is in the range of 1.0 to 3.0 times the total element core void volume of the filter elements.

The heretofore proposed backwash systems for top tube sheet filters have been limited to backwash flow rates that have proven to be inadequate for small retention rated filter elements. Further, in many applications capacities of waste treatment systems required to process liquids discharged during backwashing is limited, making numerous repeats of the backwash cycle impractical.

Such backwash systems typically start with a liquid filled vessel, except for a pressurized gas dome in a portion of the upper plenum compartment. The energy available for backwashing is limited to the energy stored in the pressurized gas. This energy is expended in overcoming: (1) the inertia of the entire mass of liquid in the vessel and (2) the entire system's resistance to flow. It is inherent in such backwash systems that the majority of the limited energy is wasted in the movement of the liquid in the lower filter compartment which provides no backwash benefits. The magnitude of this wasted energy may be gauged by considering that during a backwash, the pressure drop through the bottom drain valve and piping may be 10 to 15 times that through the filter elements, and the mass of liquid in the lower filter compartment may be about 3 times that in the upper plenum compartment at the start of a backwash cycle.

Accordingly, there is a need for an improved backwash method and apparatus for cleaning the filter elements in a top tube sheet filter that more effectively directs the energy to the backwash liquid to create a driving force for the movement of the backwash liquid in a rapidly moving piston-like flow of liquid surge downwardly through the core of the filter elements and radially outward through the filter surfaces thereof.

SUMMARY OF THE INVENTION

In accordance with the present invention, a method is provided for cleaning a plurality of filter elements, which are vertically positioned within a filter vessel having a tube sheet dividing the filter vessel into an upper plenum compartment and a lower filter compartment. The filter elements extend downwardly into the filter compartment and have upper end portions that are in fluid communication with the plenum compartment. Briefly stated, the method includes the following steps: draining at least a portion of the liquid from the filter vessel; establishing a pressurized condition in the filter compartment and the filter elements that is sufficient to support a predetermined volume of backwash liquid in the plenum compartment above the tube sheet; and increasing the pressure in the plenum compartment while reducing the pressure in the filter compartment so as to cause the fixed volume of backwash liquid to move rapidly downward through the cores of the filter elements and surge radially outward through the filter surfaces thereof. The preceding steps of the method may be repeated a plurality of times.

The apparatus of a preferred form of the invention includes a filter vessel having a tube sheet dividing the vessel into an upper plenum compartment and a lower filter compartment. A plurality of vertical precoat filter elements extend downward from the tube sheet into the filter compartment and have upper portions that communicate with the plenum compartment through openings formed in the tube sheet. The filter vessel includes a drain for draining liquid and slurries from the bottom of the vessel. A source of pressurized gas is in communication with the filter compartment for selectively establishing a pressured condition in the filter compartment and the filter elements that is sufficient to support a predetermined volume of backwash liquid in the plenum compartment above the tube sheet. A backwash liquid supply line communicates with the plenum chamber through which a predetermined volume of backwash liquid is directed into the plenum compartment. A source of pressurized gas communicates with the plenum compartment to increase the pressure therein. A vent means is provided to reduce the pressure in the filter compartment so as to cause the fixed volume of backwash liquid to move rapidly downward through the cores of the filter elements and surge radially outward through the filter surfaces thereof.

In a preferred form of the apparatus, the upper portions of the filter elements extend a short distance into the plenum compartment and a cap member is supported in covering relationship and spaced from the upper portions of the filter elements. The cap members have lower end portions spaced a short distance above the tube sheet. The source of pressurized gas that communicates with the filter compartment is preferably controlled by a regulator means to selectively control the gas pressure in the filter compartment.

DESCRIPTION OF THE DRAWING

The invention, both as to its organization and method of operation, taken together with the objects and advantages thereof, will be best understood by reference to the following detailed description taken in conjunction with the accompanying drawings, in which.

DESCRIPTION OF THE PREFERRED EMBODIMENTS

The method and apparatus of the present invention are described below in conjunction with the filter apparatus schematically illustrated in FIGS. 2 and 3. It being understood that the present invention contemplates the use of alternative apparatus in practicing the teachings of the invention.

Figure 1:
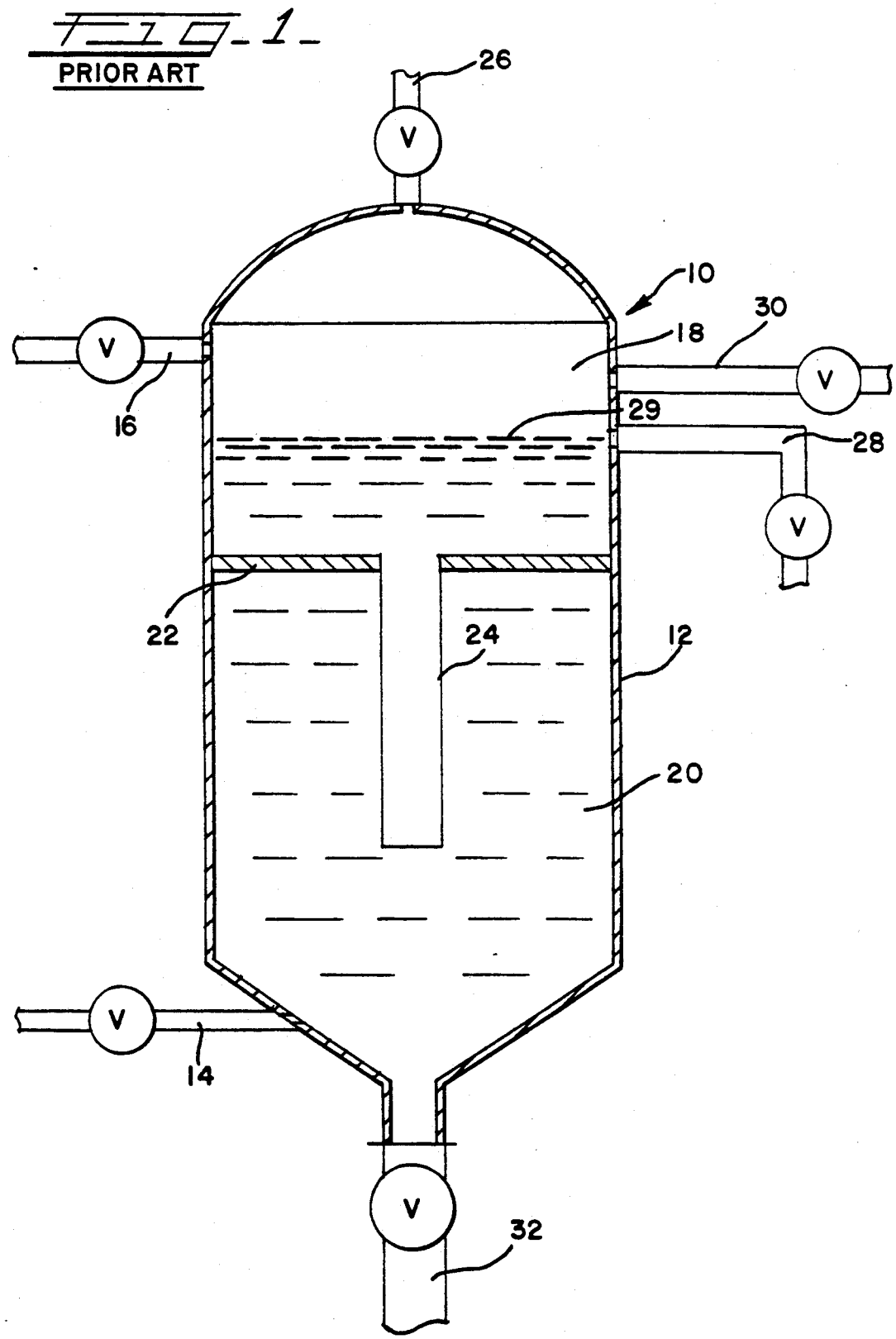
FIG. 1 is a schematic representation of a prior art filter apparatus designed to employ a prior art backwash method.

Referring to FIG. 1, a prior art filter apparatus 10 is schematically shown. Filter apparatus 10 includes a filter vessel 12 having an inlet feed line 14 and an outlet filtrate line 16. The vessel 12 is divided into an upper plenum compartment 18 and a lower filter compartment 20 by a tube sheet 22, suitably secured to the interior of the vessel 12 by welding or the like. Mounted vertically within the filter compartment 20 are a plurality of precoat filter elements 24 through which an influent stream must pass before entering the plenum compartment 18 and being discharged from the vessel through outlet line 16. The vessel is provided with a vent line 26 in communication with an upper portion of the plenum compartment 18 and a drain level line 28 in communication with an intermediate portion of plenum compartment 18. Lines 14, 16, 26 and 28 are provided with suitable valves.

When the precoat on the filter elements 24 becomes exhausted, the service cycle is stopped and a backwash cycle is initiated. At the start of the backwash cycle, the liquid level in the vessel is drained down to the level of line 29 so as to create a fixed volume of backwash liquid above tube sheet 22 in plenum compartment 18. The upper portion of compartment 18 is pressurized by directing a gas thereinto through a pressurized gas supply line 30. Opening of the bottom drain line 32 causes the backwash liquid in plenum compartment 18 to move downwardly through the cores of the filter elements and radially outward into the filter compartment. The backwash liquid, the liquid in the filter compartment, and the expelled filter cake and precoat layer are directed from the vessel through line 32. Much of the energy available from the pressurized gas to enhance the velocity of the backwash liquid is expended in overcoming the inertia of the liquid in the filter compartment and the system's resistance to flow.

Figure 2:
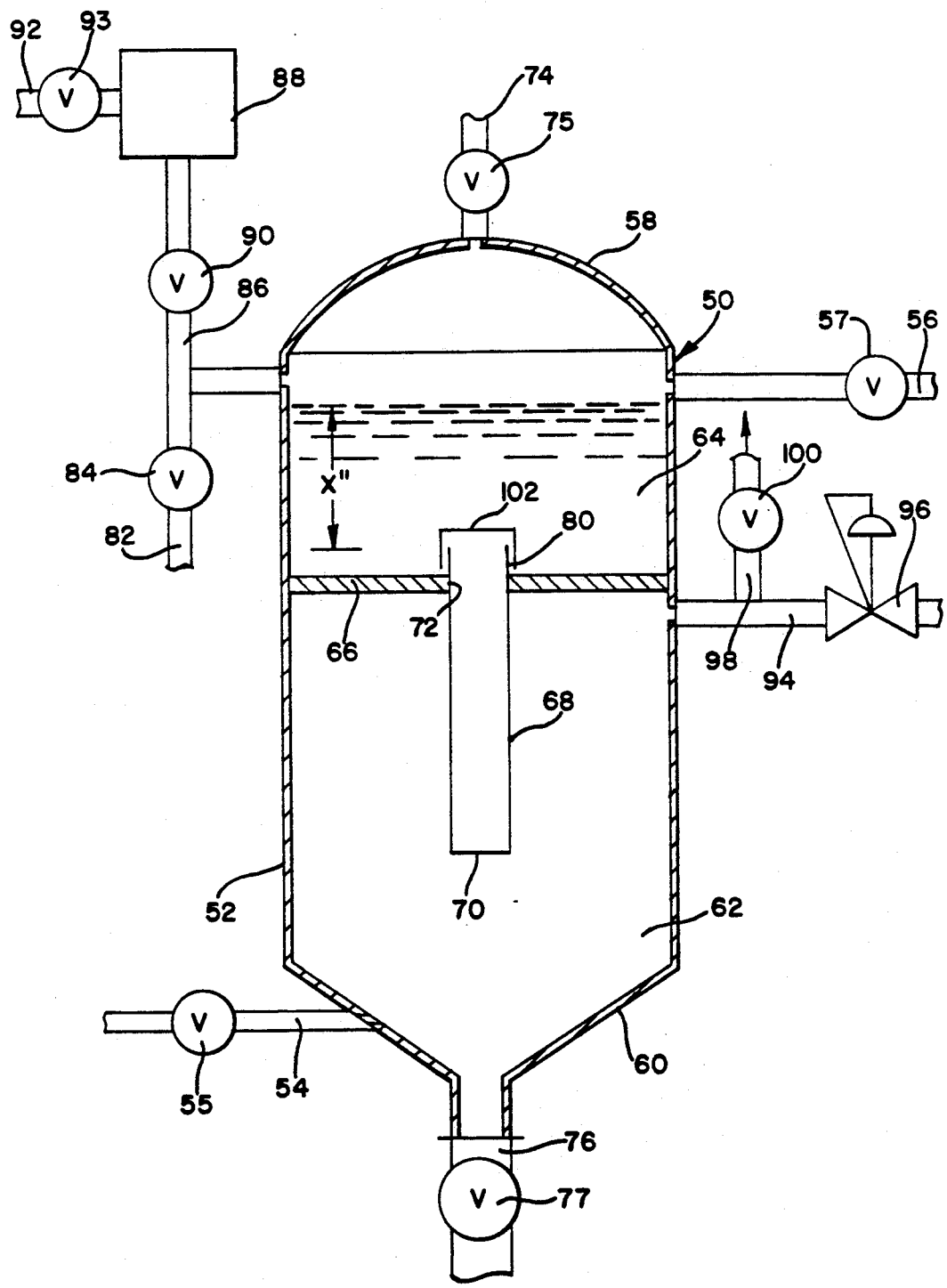
FIG. 2 is a schematic representation of a filter apparatus embodying the features of the present invention and designed to employ the backwash method of the present invention.

Referring to FIG. 2, the filter apparatus in accordance with a preferred embodiment of the invention is indicated generally by the reference numeral 50. The apparatus 50 includes a filter vessel 52 having an inlet or feed line 54, controlled by a feed valve 55, and an outlet or filtrate line 56, controlled by an outlet valve 57. The filter vessel is a generally cylindrical vessel made of steel or the like, and having a top 58 suitably shaped for the design pressure and a convex or cone shaped bottom 60. The vessel is divided into a lower, influent or filter compartment 62 and an upper, filtrate or plenum compartment 64 by a tube sheet plate 66, suitably secured to the interior of the vessel 52.

Mounted vertically within the filter compartment 62 are a plurality of filter cartridges or elements 68 (only one of which being shown), through which the influent stream must pass before entering the plenum compartment 64 and being discharged from the vessel through the outlet line 56. The filter elements 68 are typically cylindrical in shape with closed ends 70. The filter elements 68 have suitable mounting means (not shown) for securing the elements to the tube sheet 66 at a corresponding opening 72 formed therein.

A plurality of filter elements 68 are suitably spaced within vessel 52 and suitably spaced from the sidewalls of the vessel. The top 58 is provided with a vent line 74 that is controlled by a vent valve 75. The bottom 60 is provided with a drain line 76 that is controlled by a drain valve 77.

The filter apparatus 50 of the present invention will normally be used to treat a stream of liquid, such as condensate water in the steam generating system of an electrical power plant. As those skilled in the art will understand, however, the filter apparatus 50 may be used to treat other liquids.

In preparing the filter apparatus for operation, the initial step is to precoat the filter elements 68. In order to accomplish this, the filter vessel 52 is filled with a low-impurity water, such as demineralized water. A slurry of precoat medium and demineralized water is prepared in a precoat system (not shown). The precoat slurry is directed through the inlet line 54 into the filter compartment 62 of the filter vessel 52. The pressure of the incoming slurry forces the demineralized water in the filter compartment 62 through the filter elements 68 and out the filter vessel 52 via the plenum compartment 64 and the outlet line 56 and back to the precoat system. The precoat material is retained on the outer surface of the filter element 68. After virtually all of the precoat material is deposited on the elements 68, the precoating cycle is complete. The thickness of the precoat layer varies, but it is preferably in the range of about one-quarter inch to no more than fifty percent of the distance between adjacent elements. The filter apparatus 50 is now ready to treat contaminated liquids.

In operation of filter apparatus 50 during the service cycle, only valves 55 and 57 are opened, all others are closed. In this manner, untreated liquid enters the filter vessel 52 through inlet line 54 to the filter compartment 62. The pressure of the incoming untreated liquid forces it through the precoat layer, the filter elements 68, and the plenum compartment 64 into the outlet line 56 to a suitable service line (not shown). As the untreated water passes through the precoat layer and filter elements, undissolved solids are removed. Dissolved solids are also removed, if the precoat layer includes adsorbents and/or absorbents. As the service cycle continues, the ability of the precoat and filter elements to remove contaminants diminishes, and the resistance to liquid flow increases due to the accumulation of solids on and within the precoat layer, and within the filter elements.

As well known in the art, the precoat material may contain various reactive materials, such as ion exchange resins, activated carbon, etc., or non-reactive materials, or combinations thereof.

Eventually the precoat becomes exhausted or the resistance to liquid flow becomes impractical. At such time, the filtering or service cycle is stopped. It is now necessary to clean the filter elements 68, by removing the filter cake and the precoat layer therefrom, before the filter elements 68 are precoated and the filter apparatus 50 returned to service. The present invention is particularly directed to a method and apparatus to optimize the effectiveness of this cleaning cycle.

Referring again to FIG. 2, a preferred embodiment of the cleaning or backwash method in accordance with the principles of the invention will now be described. The upper end portions 80 of the filter elements 68 extend through openings 72 in tube sheet 66 into plenum compartment 64. End portions 80 are spaced a short distance above the surface of tube sheet 66. A backwash inlet line 82, in communication with a source of backwash water (not shown), communicates with plenum compartment 64. A backwash water inlet valve 84 controls the flow of backwash water into plenum compartment 64.

A gas surge line 86 in communication with a pressurized gas surge chamber 88, communicates with plenum compartment 64. A gas surge valve 90 controls the flow of pressurized gas into plenum compartment 64. The pressurized gas is directed into chamber 88 through an inlet line 92 controlled by valve 93.

A gas inlet line 94 is provided to selectively supply a pressurized gas, from a source of pressurized gas (not shown) into filter compartment 62. A regulator valve 96 is provided in line 94 to selectively control the gas pressure in filter compartment 62 for reasons that will hereinbelow become more apparent. A vent line 98, controlled by a vent valve 100, communicates with an upper portion of filter compartment 62 to vent gas from compartment 62 upon opening valve 100 to reduce the gas pressure therein.

A bubble cap member 102 is preferably located above the upper end 80 of the filter element 68 in covering relationship thereto. The lower edges of cap member 102 is spaced a short distance above the upper surface of tube sheet 66.

The discussion of the operation of the backwash method and apparatus of the present invention that hereinbelow follows describes the operation of the system and discloses certain novel relationships and operating conditions which form a part of the invention.

At the initiation of the cleaning o backwash cycle, the filter compartment 62, the plenum compartment 64 and the vessel 52 are full with liquid. The backwash cycle is initiated by opening vent valve 75 and drain valve 77 to partially or preferably fully drain the liquid from the filter compartment 62 of vessel 52. During the drain step, backwash liquid may be periodically or continuously introduced at a low flow rate through line 82 into plenum compartment 64 and then through the filter elements 68 in the reverse direction to normal flow to remove the spent resin and crude from the filter elements.

Upon completion of the drain step, valves 75 and 77 are closed and regulator valve 96 is open to direct pressurized gas into filter compartment 62. Regulator valve 96 is adjusted to achieve a pressure in compartment 62 sufficient to support a predetermined volume of backwash liquid in plenum compartment 64 having a liquid level indicated as "X" in FIG. 2. The liquid level may be increased or decreased by increasing or decreasing the pressure in compartment 62. In so doing, the volume of backwash liquid utilized during each air surge cycle may be selected. Valves 84 and 75 are open and backwash liquid is directed into the plenum compartment 64 through line 82 until the predetermined volume of backwash liquid is established above tube sheet 66.

At this point in the backwash cycle, the filter elements 68 and the filter compartment 62 are substantially free of liquid. Valve 84 is then closed and valves 90, 100 and 77 are quickly opened to increase the pressure in compartment 64 and decrease the pressure in compartment 62 creating a pressure differential therebetween. In so doing a driving force is achieved for movement of the volume of backwash liquid. Since compartment 64 and the filter elements 68 are free of liquid, an unimpeded piston like flow of the backwash liquid from above the tube sheet 66 surges down the core of each of the filter elements. As the rapidly moving piston of liquid reaches the bottom of each filter element, the kinetic energy of the liquid is converted to a high pressure wave which reflects up the column of liquid in each filter element. As the wave moves upwards, instantaneous high radial flow surges are created at the filter surface of each filter element.

Following the kinetic air surge step, backwash liquid flow is sustained, unimpeded by liquid in the filter chamber.

The aforementioned kinetic air surge step may be repeated a sufficient number of times to thoroughly clean the filter elements 68. During subsequent kinetic surge steps, it may be desirable to allow the filter compartment 62 to partially fill with backwash liquid immediately prior to initiation of the next backwash step. By so doing, turbulence is created within compartment 62 which helps to break up large chunks of materials and facilitates the removal thereof from vessel 60.

After the filter elements 68 have been thoroughly cleaned, the filter compartment 62 is drained for the last time and the hereinabove described precoating procedure is initiated.

In accordance with a presently preferred embodiment, the fixed volume of backwash liquid is in the range of 1.0 to 3.0 times the total core void volume of the filter elements.

The above described method and apparatus in accordance with the present invention solves a long known problem of in-situ cleaning of the filter elements of top tube sheet filters. The method and apparatus of the invention provides a means of effectively directing the energy to the backwash liquid to create a driving force for the movement of the backwash liquid in a rapidly moving piston-like flow of liquid surge downwardly through the core of the filter elements and radially outward through the filter surfaces thereof. By utilizing air pressure to establish the desired volume of backwash liquid, a different volume may be achieved by merely adjusting the air pressure. Such utilization of air pressure also minimizes the size of the bubble cap 102 and reduces the cost thereof.

Many modifications and variations of the present invention as hereinabove set forth will occur to those skilled in the art, and it is intended to cover in the appended claims all such modifications and variations as fall within the true spirit and scope of the invention.

What is claimed is:

1. A method for cleaning a plurality of filter elements having inner cores vertically positioned within a filter vessel which has a tube sheet dividing the filter vessel into a lower filter compartment and an upper plenum compartment, said filter elements being positioned within said filter compartment and having upper portions that are in fluid communication with said plenum compartment through openings formed in said tube sheet, said method comprising:

draining substantially all of the liquid from the filter compartment;

establishing a pressurized condition in said filter compartment and said filter elements that is sufficient to support a predetermined volume of backwash liquid in said plenum compartment above said tube sheet;

increasing the pressure in said plenum compartment and reducing the pressure in said filter compartment so as to cause said predetermined volume of backwash liquid to move rapidly downward through the cores of said filter elements and surge radially outward through the filter surfaces thereof.

2. The method as defined in claim 1 wherein said fixed volume of backwash liquid is in the range of 1.0 to 3.0 times the total core void volume of said filter elements.

3. The method as defined in claim 2 wherein said preceding steps are repeated a plurality of times.

4. Apparatus for filtering liquids, comprising:

a filter vessel, a tube sheet dividing said vessel into a lower filter compartment and an upper plenum compartment, a plurality of filter elements vertically mounted in said filter compartment, said filter elements having upper portions that communicate with said plenum compartment through openings formed in said tue sheet, said upper portions of said filter elements extend a short distance into said plenum compartment and a cap member is supported in covering relationship and spaced from said upper portions of said filter elements, said cap members having lower end portions spaced from said tube sheet;

means for draining at least a portion of the liquid from the filter compartment;

means for establishing a pressurized condition in said filter compartment and said filter elements that is sufficient to support a predetermined volume o backwash liquid in said plenum compartment above said tube sheet;

means for directing said predetermined volume of backwash liquid into said plenum compartment;

means for increasing the pressure in said id plenum compartment and means for reducing the pressure in said filter compartment so as to cause said fixed volume of backwash liquid to move rapidly downward through the cores of said filer elements and surge radially outward through the filter surfaces thereof.

5. The invention as defined in claim 4 wherein said means for establishing a pressurized condition in said filer compartment and said filer elements includes an air supply conduit having a first end in fluid communication with an air source and a second end in fluid communication with said filer compartment.

6. The invention as defined in claim 5 wherein said air supply conduit includes a regulator means to selectively control the air pressure in said filter compartment.

7. The invention as defined in claim 4 wherein said means for increasing the pressure in said plenum compartment includes an external air surge chamber containing pressurized air that is in fluid communication with said plenum compartment through an air surge conduit.

8. The invention as defined in claim 7 wherein said air surge conduit includes an air surge valve for controlling the air pressure in said plenum compartment.

9. The invention as defined in claim 4 wherein said means for reducing the pressure in said filter compartment includes a vent conduit in fluid communication with said filter compartment having a vent valve associated therewith.

* * * * *